United States Patent [19]

Tanabe et al.

[11] 4,410,979
[45] Oct. 18, 1983

[54] MULTIPLEXED SIGNAL RECEIVER

[75] Inventors: Kenzo Tanabe, Katano; Yasuhiro Okada, Hino, both of Japan

[73] Assignee: Matsushita Electric Industrial Co., Ltd., Osaka, Japan

[21] Appl. No.: 242,683

[22] Filed: Mar. 11, 1981

[30] Foreign Application Priority Data

Mar. 13, 1980 [JP] Japan .................................. 55-32281

[51] Int. Cl.³ .......................... H04J 9/00; H04H 5/00
[52] U.S. Cl. ...................................... 370/11; 329/135; 381/15
[58] Field of Search ........................ 370/11; 179/1 GS; 329/135, 167, 50

[56] References Cited

U.S. PATENT DOCUMENTS 4,169,968 10/1979 Parker .............................. 179/1 GS
4,215,316 7/1980 Yamaguchi et al. ............. 179/1 GS
4,324,952 4/1982 Smiley ............................... 179/1 GS Primary Examiner—Douglas W. Olms
Attorney, Agent, or Firm—Wenderoth, Lind & Ponack

[57] ABSTRACT

A multiplexed signal receiver is arranged such that two independent signals are multiplexed on a single carrier by amplitude and frequency modulation or amplitude and or phase modulation. The multiplexed signal receiver includes a balanced type amplitude limiter and two double balanced type product detectors for amplitude and frequency or amplitude and phase demodulation. The receiver uses the direct coupling between said amplitude limiter and the two product detectors to facilitate the circuit integration thereof on a monolithic semiconductor chip.

3 Claims, 4 Drawing Figures

MULTIPLEXED SIGNAL RECEIVER

BACKGROUND OF THE INVENTION

This invention relates to a multiplexed signal receiver, where two independent signals are multiplexed on a single carrier by amplitude and frequency modulation or amplitude and phase modulation.

SUMMARY OF THE INVENTION

The object of this invention is to prepare a simple and novel circuit configuration for a multiplexed signal receiver which is suitable for constructing monolithic integrated circuits.

To accomplish the above-noted object, this invention utilizes a balanced type amplitude limiter and two double balanced type product detectors for amplitude and frequency demodulation or amplitude and phase demodulation, characterized by the adoption of direct coupling between said amplitude limiter and said two product type detectors. The detailed description presented with figures is noted below:

DESCRIPTION OF THE PREFERRED EMBODIMENT

Figure 1:
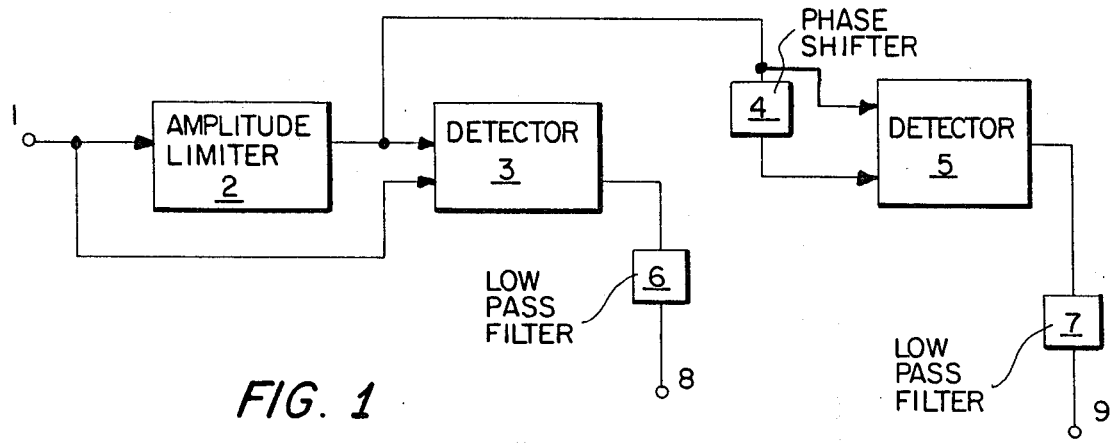
FIG. 1 is a block diagram of a receiver demodulation circuit according to this invention.

FIG. 1 shows a circuit block diagram of a receiver demodulation circuit which is applied to the present invention; an input terminal 1 has a multiplexed signal applied thereto, the frequency of which is usually converted to an intermediate frequency band; an amplitude limiter 2 has the multiplexed signal applied thereto through the input terminal 1, wherein the amplitude of said multiplexed signal is kept constant at the output; a product detector 3 acts as an amplitude demodulator to which the output signal from said amplitude limiter 2 and the multiplexed signal from input terminal 1 are applied; a phase shifter 4 has the output signal from said amplitude limiter 2 applied thereto; a product detector 5 has the output signal from the amplitude limiter 2 and the output signal from the phase shifter 4 applied thereto, wherein the phase shifter 4 and the product detector 4 act as a usual quadrature type frequency demodulator; are low pass filters 6 and 7 have the output signals from said product detectors 3 and 5 applied thereto, through which amplitude demodulated signals and frequency demodulated signals respectively pass; output terminals are the respective output terminals for the low pass filters 6 and 7.

Figure 2:
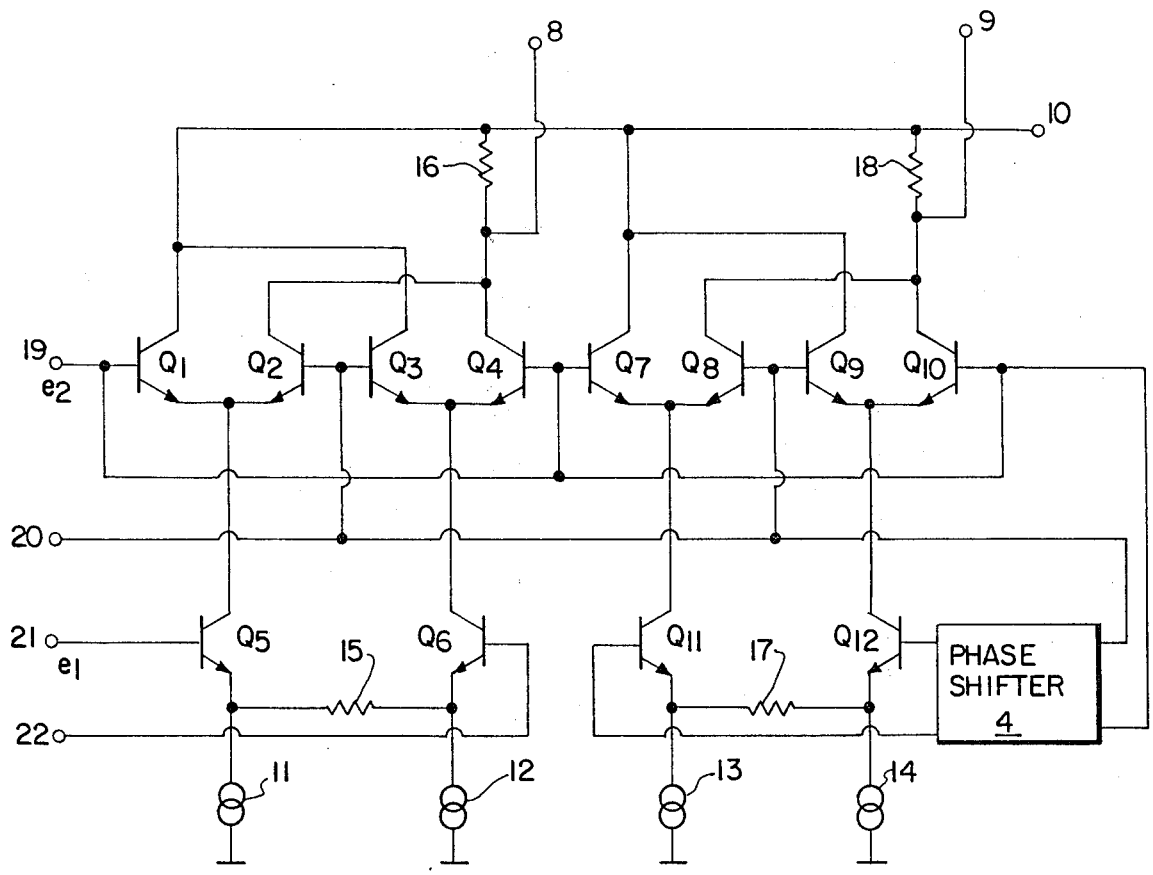
FIG. 2 is an example of a practical demodulation circuit diagram of the main portion of FIG. 1.

FIG. 2 shows an example of a practical demodulation circuit diagram which is applied to the present invention, where double balanced type product detectors are utilized.

The upper transistor pairs ($Q_1$, $Q_2$), ($Q_3$, $Q_4$), ($Q_7$, $Q_8$) and ($Q_9$, $Q_{10}$) which are called the switching part and act as respective differential switches. The lower transistor pairs ($Q_5$, $Q_6$) and ($Q_{11}$, $Q_{12}$) act as differential amplifiers for modulated signals, the transconductance of which is determined by resistors 15 and 17 respectively.

Resistors 16 and 18 are load resistors for these demodulation circuits. DC current sources 11, 12, 13 and 14 are utilized to establish the operating point of all of the transistors. The phase shifter 4 as shown in FIG. 1 is also shown in FIG. 2 and is usually composed of inductors and capacitors. A DC supply voltage is applied to terminal 10.

In FIG. 2, the transistor pairs ($Q_1$, $Q_2$), ($Q_3$, $Q_4$), ($Q_5$, $Q_6$), resistors 15, 16, and DC current sources 11 and 12 compose a double balanced type product detector for amplitude modulation which is shown as the product type detector 3 in FIG. 1. An amplitude limited signal, which is obtained from amplitude limiter 2, as shown in FIG. 1, is applied to the input terminals 19 and 20, where the waveform of the voltage difference between these two terminals is shown as $e_2$ in FIG. 3. A multiplexed signal, which is obtained from input terminal 1 as shown in FIG. 1, is applied to the input terminals 21 and 22, where the waveform of the voltage difference between these two terminals is shown as $e_1$ in FIG. 3.

In the case of this amplitude demodulation circuit, the operating point of the differential amplifier, which is composed of transistors $Q_5$ and $Q_6$ and resistor 15, is set in a linear operating region, and the multiplexed signal amplified by this differential amplifier is synchronously switched on and off by the amplitude limited signal through terminals 19 and 20, and the phase thereof is set to be the same as the phase of the multiplexed signal.

This phase relationship of these two signals, that is, the amplitude limited signal and the multiplexed signal, is easily adjusted by appropriately designing the phase characteristics of the amplitude limiter 2 shown in FIG. 1.

Figure 3:
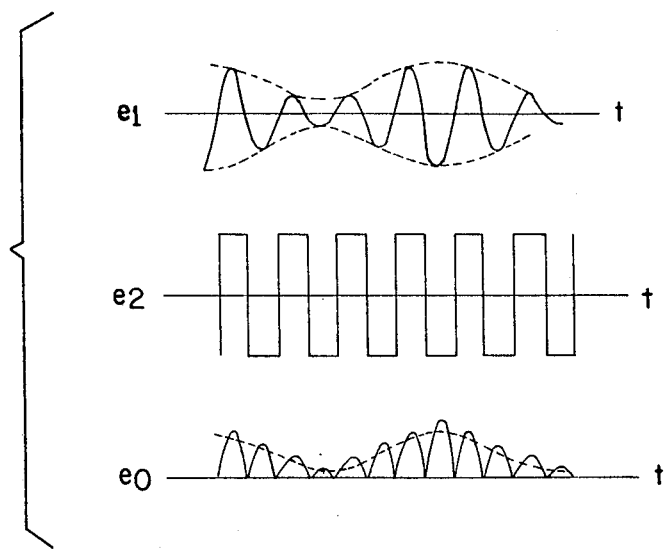
FIG. 3 and FIG. 4 are waveforms of signals appearing in the circuit of FIG. 2.

Thus, the amplitude demodulated signal is obtained from the output terminal 8, where the waveform of the demodulated signal is shown as $e_0$ in FIG. 3. The output signal obtained from terminal 8 is applied to the low pass filter 6 in FIG. 1.

In FIG. 3, the dotted line accompanying the waveform $e_1$ represents the envelope of the multiplexed signal and the dotted line accompanying the waveform $e_0$ represents the waveform of the output signal of the low pass filter 6 in FIG. 1.

In FIG. 2, the transistor pairs ($Q_7$, $Q_8$), ($Q_9$, $Q_{10}$), ($Q_{11}$, $Q_{12}$), resistors 17 and 18, dc current sources 13 and 14, and phase shifter 4 compose a quadrature type frequency demodulation circuit which is shown as the product type detector 5 and the phase shifter 4 in FIG. 1.

The amplitude limited signal input through input terminals 19 and 20 is also applied to transistor pairs ($Q_7$, $Q_8$) and ($Q_9$, $Q_{10}$) to switch on and off the signal from transistor pair ($Q_{11}$, $Q_{12}$). The amplitude limited signal is also applied to the phase shifter 4, the output signal from which is applied to the input of the differential amplifier composed of transistor pair ($Q_{11}$, $Q_{12}$). The phase shifter is usually designed to have a 90 degrees phase shift at the carrier frequency and to have a constant group delay time at the frequency band occupied by the amplitude limited signal which contains only the frequency or phase modulation component.

Figure 4:
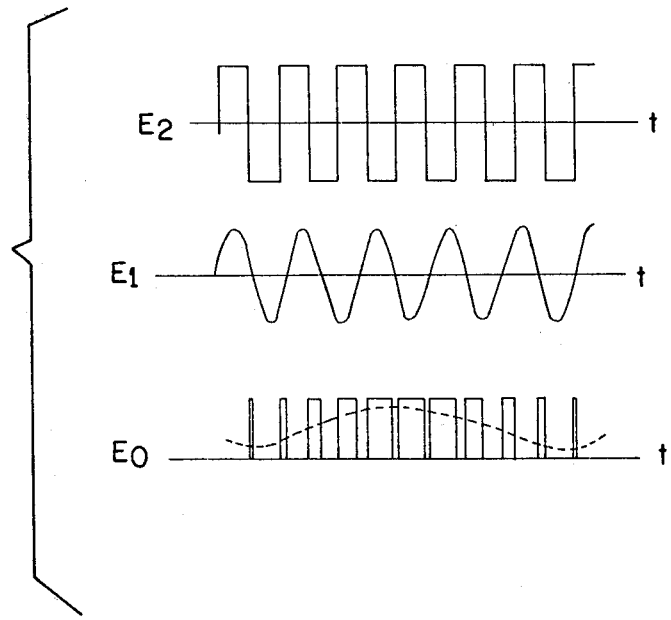

The waveform of the output signal from the phase shifter is shown as $E_1$ in FIG. 4. In this quadrature type detector, the transistor pair ($Q_{11}$, $Q_{12}$) is usually designed to be overdriven like a switching transistor by the signal from the phase shifter 4. Thus, the output signal at terminal 9 is analogous to a pulse width modulated signal the waveform of which is shown as $E_0$ in FIG. 4. The waveform $E_2$ in FIG. 4 shows the waveform of the input signal applied to the phase shifter 4.

The output signal obtained from terminal 9 is applied to the low pass filter 7 shown in FIG. 1. The dotted line accompanying the waveform $E_0$ in FIG. 4 represents the waveform of the output signal of the low pass filter 7. In the above-noted detailed description of the circuit configuration, the description of the amplitude limiter is abbreviated because any type of amplitude limiter could be applicable; however, it is better to use an amplitude limiter composed of a cascaded differential amplifier chain, having a DC negative feedback loop to stabilize the DC operating point, the output signal amplitude of which is limited by a bias current.

This type of amplitude limiter is called a balanced type amplitude limiter and can generate two output signals having the same DC bias voltage and the same limited signal amplitude but with reversed phases. Therefore this type of amplitude limiter could easily be used to utilize DC coupling between this amplitude limiter and two product detectors for amplitude and frequency demodulation.

The prime feature of this invention is the adoption of above-said direct coupling between the amplitude limiter and the two product detectors. This direct coupling facilitates the circuit integration on a monolithic semiconductor chip and reduces costs because it lessens the number of the output terminals of the monolithic IC which include the amplitude limiter and the two product detectors, and because it also lessens the number of peripheral elements accompanying the monolithic IC.

In the above-noted description, a multiplexed signal, where two independent signals are multiplexed on a single carrier by amplitude and frequency modulation, is described. However, it is easy to apply the present invention to the multiplexed signal where two independent signals are multiplexed on a single carrier by amplitude and phase modulation, because of the fact that the phase demodulation is easily accomplished by utilizing a frequency demodulator and an integrator.

What is claimed is:

1. A multiplexed signal receiver having two independent signals which are multiplexed on a single carrier by amplitude and frequency modulation or amplitude and phase modulation, said receiver comprising a balanced type amplitude limiter which is coupled to two double balanced type product detectors for amplitude and frequency demodulation or amplitude and phase demodulation, said balanced amplitude limiter being directly coupled with respect to DC to said two double balanced type product detectors.

2. A multiplexed signal receiver according to claim 1, wherein said balanced type amplitude limiter and said two double balanced type product detectors are integrated on a monolithic semiconductor chip.

3. A multiplexed signal receiver having two independent signals which are multiplexed on a single carrier by amplitude and frequency modulation or amplitude and phase modulation, said receiver comprising a balanced type amplitude limiter and two double balanced type product detectors for amplitude and frequency demodulation or amplitude and phase demodulation, switching parts of said two double balanced type product detectors being directly connected with respect to DC to each other and to an output of said balanced type amplitude limiter.

* * * * *